US009195620B2

(12) United States Patent
Wu et al.

(10) Patent No.: US 9,195,620 B2
(45) Date of Patent: Nov. 24, 2015

(54) COMPUTER SYSTEM HAVING CAPACITY INDICATION FUNCTION OF SERIAL ADVANCED TECHNOLOGY ATTACHMENT DUAL IN-LINE MEMORY MODULE DEVICE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Kang Wu, Shenzhen (CN); Bo Tian, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 323 days.

(21) Appl. No.: 13/851,135

(22) Filed: Mar. 27, 2013

(65) Prior Publication Data

US 2014/0185227 A1   Jul. 3, 2014

(30) Foreign Application Priority Data

Dec. 29, 2012  (CN) .......................... 2012 1 0587753

(51) Int. Cl.
| | | |
|---|---|---|
| *H05K 7/00* | (2006.01) | |
| *G06F 13/16* | (2006.01) | |
| *G06F 12/02* | (2006.01) | |
| *G06F 13/00* | (2006.01) | |
| *G06F 1/18* | (2006.01) | |

(52) U.S. Cl.
CPC ................ *G06F 13/16* (2013.01); *G06F 1/185* (2013.01); *G06F 12/0246* (2013.01); *G06F 13/00* (2013.01)

(58) Field of Classification Search
USPC ............ 361/728–730, 720, 760, 792, 679.31; 439/43, 45; 701/301
See application file for complete search history.

(56) References Cited

U.S. PATENT DOCUMENTS

| | | | | |
|---|---|---|---|---|
| 7,215,540 | B2 * | 5/2007 | Lien .......................... | 361/679.32 |
| 8,503,187 | B2 * | 8/2013 | Wu et al. ........................ | 361/760 |
| 8,520,401 | B2 * | 8/2013 | Tian et al. ...................... | 361/785 |
| 2012/0320538 | A1 * | 12/2012 | Wu et al. ........................ | 361/748 |
| 2013/0155601 | A1 * | 6/2013 | Tian ........................... | 361/679.31 |
| 2014/0160664 | A1 * | 6/2014 | Yang ........................... | 361/679.32 |
| 2015/0067388 | A1 * | 3/2015 | Xiao et al. ................... | 714/6.12 |

FOREIGN PATENT DOCUMENTS

| | | | |
|---|---|---|---|
| TW | 201135453 | A1 | 10/2011 |
| TW | 201250703 | A1 | 12/2012 |

* cited by examiner

*Primary Examiner* — Hung S Bui
(74) *Attorney, Agent, or Firm* — Novak Druce Connolly Bove + Quigg LLP

(57) ABSTRACT

A computer system includes a serial advanced technology attachment dual-in-line memory module (SATA DIMM) device and a motherboard. The SATA DIMM device includes a control chip and an edge connector. The motherboard includes a memory slot and a light emitting diode (LED). When the edge connector is inserted into the memory slot, first power pins, first ground pins, and first indication pin of the memory slot are respectively connected to second power pins, second ground pins, and second indication pin of the SATA DIMM device. The motherboard outputs a voltage to the control chip through the first and second power pins. The control chip detects and calculates the storage capacity of the SATA DIMM device and outputs a control signal to control the LED to turn on or not, for displaying free memory capacity of the SATA DIMM device.

6 Claims, 2 Drawing Sheets

COMPUTER SYSTEM HAVING CAPACITY INDICATION FUNCTION OF SERIAL ADVANCED TECHNOLOGY ATTACHMENT DUAL IN-LINE MEMORY MODULE DEVICE

BACKGROUND

1. Technical Field

The present disclosure relates to a computer system having capacity indication function of a serial advanced technology attachment dual in-line memory module (SATA DIMM) device.

2. Description of Related Art

Solid state drives (SSD) store data on chips instead of on moving magnetic or optical discs. One type of SSD has the form factor of a DIMM module and it is called a SATA DIMM device. The SATA DIMM device can be inserted into a memory slot of a motherboard, to add storage capacity. However, when the storage capacity of the SATA DIMM device is full, data stored on the SATA DIMM device may need to be deleted to make room for new data or the new data must be discarded. This is an inconvenience when erasing of data may not be an option and the new data is too important to be discarded. Therefore there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the drawings, is illustrated by way of example and not by way of limitation. References to "an" or "one" embodiment in this disclosure are not necessarily to the same embodiment, and such references mean at least one.

Figure 1:
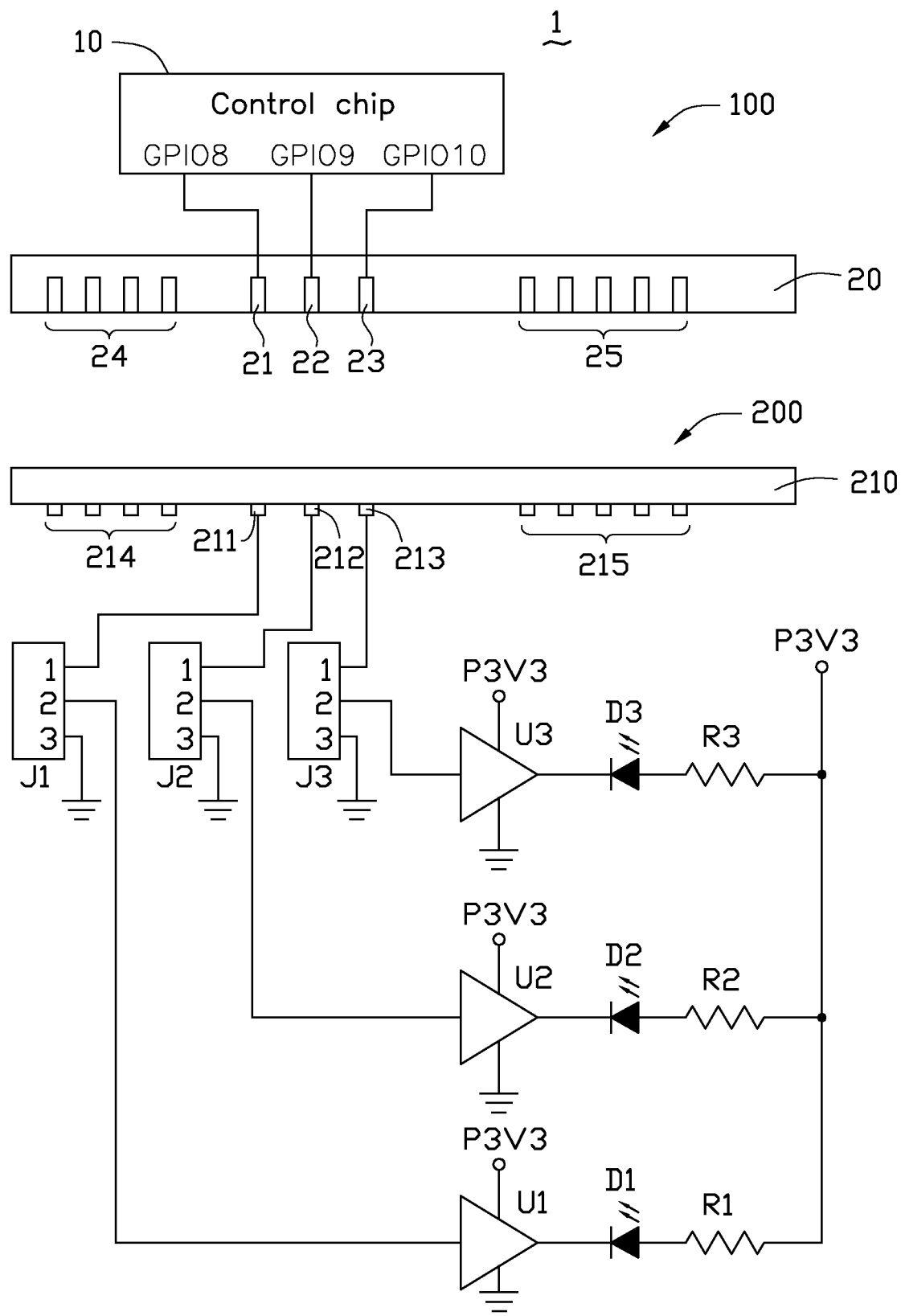
FIG. 1 is a circuit diagram of a computer system having a capacity indication function, in accordance with an embodiment of the present disclosure, the computer system includes a SATA DIMM device and a motherboard.
Figure 2:
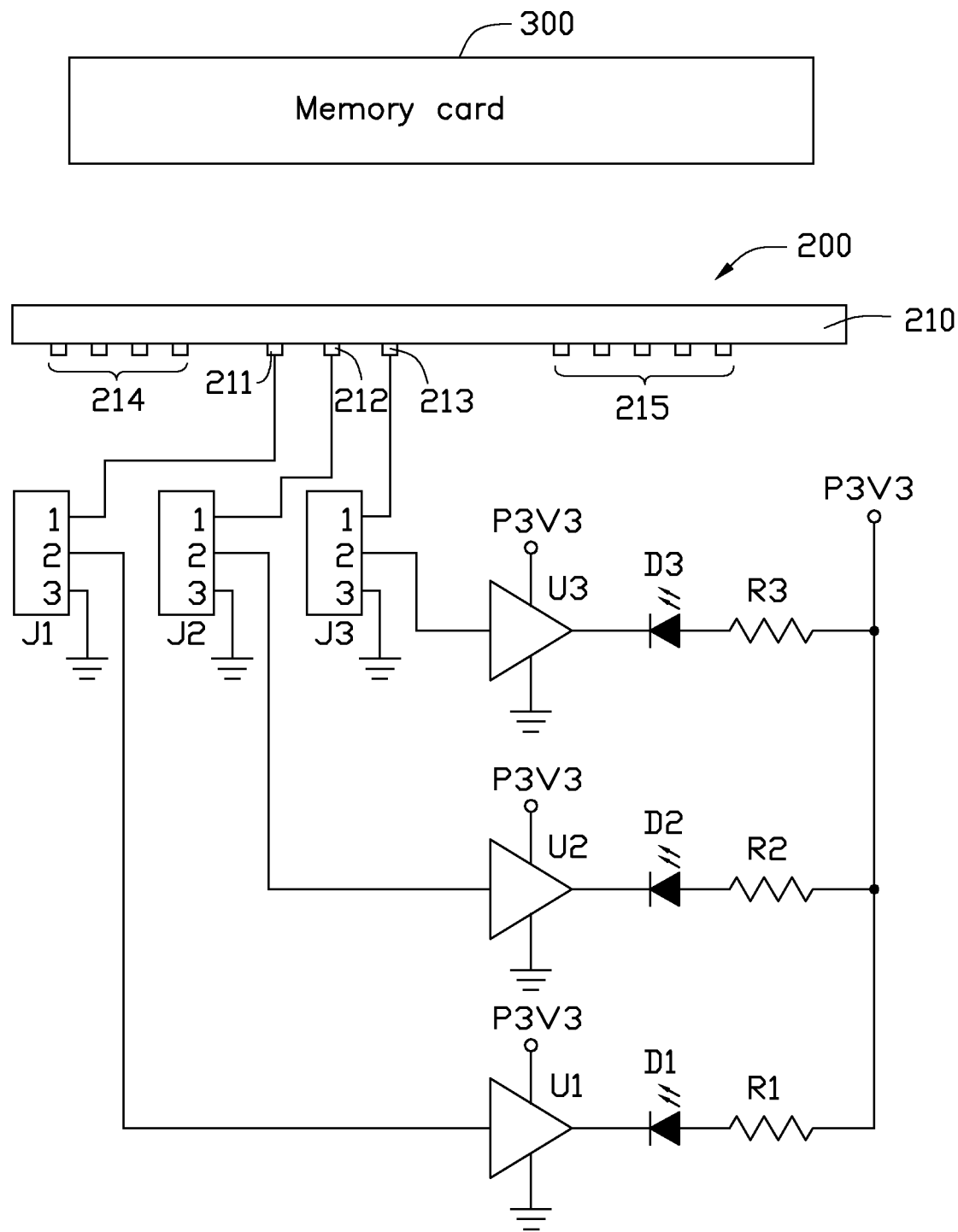
FIG. 2 is a circuit diagram of the motherboard of FIG. 1 receiving a memory card.

FIGS. 1 and 2 illustrate a computer system 1 in accordance with an embodiment. The computer system 1 includes a serial advanced technology attachment dual-in-line memory module (SATA DIMM) device 100 and a motherboard 200.

The SATA DIMM device 100 includes a control chip 10 and an edge connector 20. In one embodiment, other elements of the SATA DIMM device 100 are the same as a general SATA DIMM device. The edge connector 20 includes a plurality of power pins 24, a plurality of ground pins 25, and three indication pins 21-23. The power pins 24 are connected to the control chip 10. The ground pins 25 are grounded. The indication pins 21-23 are respectively connected to three input output (I/O) pins GPIO8-GPIO10.

A memory slot 210, such as a double data rate type three (DDR3) or a double data rate type two (DDR2) memory slot, connectors J1-J3, buffers U1-U3, light emitting diodes (LEDs) D1-D3, and resistors R1-R3 are all arranged on the motherboard 200. The memory slot 210 includes a plurality of power pins 214 corresponding to the power pins 24, a plurality of ground pins 215 corresponding to the ground pins 25, and three indication pins 211, 212, and 213 corresponding to the indication pins 21, 22, and 23 of the SATA DIMM device 100. The power pins 211 and the ground pins 215 are respectively connected to a power layer (not shown) and a ground layer (not shown) of the motherboard 200. The indication pins 211-213 are respectively connected to pins 1 of the connectors J1-J3. Pins 3 of the connectors J1-J3 are grounded. Pins 2 of the connectors J1-J3 are respectively connected to input terminals of the buffers U1-U3. Output terminals of the buffers U1-U3 are respectively connected to cathodes of the LEDs D1-D3. Anodes of the LEDs D1-D3 are connected to a power source P3V3 respectively through the resistors R1-R3. Voltage terminals of the buffers U1-U3 are connected to the power source P3V3. Ground terminals of the buffers U1-U3 are grounded.

In use, the edge connector 20 is inserted into the memory slot 210. The power pins 24 are connected to the power pins 214, the ground pins 25 are connected to the ground pins 215, and the indication pins 21-23 are respectively connected to the indication pins 211-213. A SATA connector (not shown) of the SATA DIMM device 100 is connected to a SATA connector (not shown) of the motherboard 200 by a cable (not shown). At the same time, a jumper is connected to pins 1 and 2 of each of the connectors J1-J3.

When the motherboard 200 receives power, the motherboard 200 outputs a voltage to the control chip 10 through the power pins 214 and 24. At the same time, the motherboard 200 outputs a signal, such as a SATA signal to the control chip 10 through the SATA connectors of the motherboard 200 and the SATA DIMM device 100. The control chip 10 detects work states of the SATA DIMM device 100 and calculates the storage capacity of the SATA DIMM device 100, and outputs different control signals through the I/O pins GPIO8-GPIO10 according to the storage capacity, to selectively control the LEDs D1-D3 to turn on for displaying free memory capacity of the SATA DIMM device 100.

When free memory capacity of the SATA DIMM device 100 is 0%, the I/O pins GPIO8-GPIO10 of the control chip 10 output high level signals as a control signal, namely, the control signal is "111", the control signal is provided to the input terminals of the buffers U1-U3 through the indication pins 21-23 and 211-213 and the pins 1 and 2 of the connectors J1-J3. The output terminals of the buffers U1-U3 output high level signals. The LEDs D1-D3 do not turn on, to display free memory capacity of the SATA DIMM device 100 is 0%.

When free memory capacity of the SATA DIMM device 100 is 20%, the I/O pins GPIO8 and GPIO9 of the control chip 10 output low level signals and the I/O pin GPIO10 of the control chip 10 outputs a high level signal as a control signal, namely, the control signal is "001". The control signal is provided to the input terminals of the buffers U1-U3 through the indication pins 21-23 and 211-213 and the pins 1 and 2 of the connectors J1-J3. The output terminals of the buffers U1 and U2 output low level signals. The output terminal of the buffer U3 outputs a high level signal. The LEDs D1 and D2 turn on, and the LED D3 does not turn on, to display free memory capacity of the SATA DIMM device 100 is 20%.

When free memory capacity of the SATA DIMM device 100 is 40%, the I/O pins GPIO8 and GPIO10 of the control chip 10 output low level signals and the I/O pin GPIO9 of the control chip 10 outputs a high level signal as a control signal, namely, the control signal is "010". The control signal is provided to the input terminals of the buffers U1-U3 through the indication pins 21-23 and 211-213 and the pins 1 and 2 of the connectors J1-J3. The output terminals of the buffers U1 and U3 output low level signals. The output terminal of the buffer U2 outputs a high level signal. The LEDs D1 and D3 turn on, and the LED D2 does not turn on, to display free memory capacity of the SATA DIMM device 100 is 40%.

When free memory capacity of the SATA DIMM device 100 is 60%, the I/O pin GPIO8 of the control chip 10 outputs a low level signal and the I/O pins GPIO9 and GPIO10 of the control chip 10 output high level signals as a control signal, namely, the control signal is "011". The control signal is provided to the input terminals of the buffers U1-U3 through the indication pins 21-23 and 211-213 and the pins 1 and 2 of the connectors J1-J3. The output terminal of the buffer U1 outputs a low level signal. The output terminals of the buffers U2 and U3 output high level signals. The LED D1 turns on, and the LEDs D2 and D3 do not turn on, to display free memory capacity of the SATA DIMM device 100 is 60%.

When free memory capacity of the SATA DIMM device 100 is 80%, the I/O pin GPIO8 of the control chip 10 outputs a high level signal and the I/O pins GPIO9 and GPIO10 of the control chip 10 outputs low level signals as a control signal, namely, the control signal is "100". The control signal is provided to the input terminals of the buffers U1-U3 through the indication pins 21-23 and 211-213 and the pins 1 and 2 of the connectors J1-J3. The output terminal of the buffer U1 outputs a high level signal. The output terminals of the buffers U2 and U3 output low level signals. The LED D1 does not turn on, and the LEDs D2 and D3 turn on, to display free memory capacity of the SATA DIMM device 100 is 80%.

When a memory card 300 is inserted into the memory slot 210, the pins 2 and 3 of each of the connectors J1-J3 are connected through one jumper. The LEDs D1-D3 do not turn on, to display the memory slot 210 receives the memory card 300.

The visible indication of the capacity of the SATA DIMM device 100 as revealed by the LEDs D1-D3 of the motherboard 200 is easy to see and useful.

Even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A computer system, comprising:
    a motherboard comprising:
        a memory slot comprising:
            a plurality of first power pins, a plurality of first ground pins, and a first indication pin; and
            a first light emitting diode (LED) comprising an anode connected to a power source and a cathode connected to the first indication pin; and
    a serial advanced technology attachment dual-in-line memory module (SATA DIMM) comprising:
        an edge connector comprising a plurality of second power pins connected to the first power pins, a plurality of second ground pins connected to the first ground pins, and a second indication pin connected to the first indication pin; and
        a control chip connected to the plurality of second power pins of the edge connector, wherein the control chip comprises a first input output (I/O) pin connected to the second indication pin;
    wherein the edge connector further comprises third and fourth indication pins connected to second and third I/O pins of the control chip, respectively, the motherboard further comprises second and third LEDs, the memory slot further comprises fifth and sixth indication pins, wherein the fifth indication pin is connected to a cathode of the second LED, the sixth indication pin is connected to a cathode of the third LED, anodes of the second and third LEDs are connected to the power source, the control chip outputs different control signals through the first to third I/O pins according to the storage capacity to control the first to third LEDs to turn on or not;
    wherein when the edge connector is inserted into the memory slot, the first power pins, the first ground pins, and the first indication pin are respectively connected to the second power pins, the second ground pins, and the second indication pin, the motherboard outputs a voltage to the control chip through the first and second power pins, the control chip detects the work states of the SATA DIMM device and calculates the storage capacity of the SATA DIMM device, and outputs a control signal through the first I/O pin according to the storage capacity, to control the first LED to turn on or not for displaying free memory capacity of the SATA DIMM device.

2. The computer system of claim 1, wherein the motherboard further comprises first to third connectors, the first indication pin is connected to a first pin of the first connector, a second pin of the first connector is connected to the cathode of the first LED, the fifth indication pin is connected to a first pin of the second connector, a second pin of the second connector is connected to the cathode of the second LED, the sixth indication pin is connected to a first pin of the third connector, a second pin of the third connector is connected to the cathode of the third LED, third pins of the first to third connectors are grounded; when the edge connector of the SATA DIMM device is connected to the memory slot of the motherboard, the first and second pins of each of the first to third connectors are connected; when a memory card is connected to the memory slot of the motherboard, the second and third pins of each of the first to third connectors are connected.

3. The computer system of claim 2, wherein the motherboard further comprises first to third buffers, an input terminal of the first buffer is connected to the second pin of the first connector, an output terminal of the first buffer is connected to the cathode of the first LED, an input terminal of the second buffer is connected to the second pin of the second connector, an output terminal of the second buffer is connected to the cathode of the second LED, an input terminal of the third buffer is connected to the second pin of the third connector, an output terminal of the third buffer is connected to the cathode of the third LED, voltage terminals of the first to third buffers are connected to the power source, ground terminals of the first to third buffers are grounded.

4. The computer system of claim 1, wherein the motherboard further comprises first to third resistors, the first resistor is connected between the anode of the first LED and the power source, the second resistor is connected between the anode of the second LED and the power source, the third resistor is connected between the anode of the third LED and the power source.

5. The computer system of claim 1, wherein the memory slot is a double data rate type three (DDR3) memory slot.

6. The computer system of claim 1, wherein the memory slot is a double data rate type two (DDR2) memory slot.

* * * * *